(12) United States Patent
Masuda

(10) Patent No.: US 11,840,419 B2
(45) Date of Patent: Dec. 12, 2023

(54) SHEET STOPPER AND IMAGE FORMING APPARATUS

(71) Applicant: SHARP KABUSHIKI KAISHA, Sakai (JP)

(72) Inventor: Junya Masuda, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/939,876

(22) Filed: Sep. 7, 2022

(65) Prior Publication Data

US 2023/0094534 A1 Mar. 30, 2023

(30) Foreign Application Priority Data

Sep. 24, 2021 (JP) ................................. 2021-155994

(51) Int. Cl.
*B65H 9/06* (2006.01)
*B65H 45/14* (2006.01)
*G03G 15/00* (2006.01)
*H04N 1/00* (2006.01)

(52) U.S. Cl.
CPC ....... *B65H 45/144* (2013.01); *G03G 15/6552* (2013.01); *H04N 1/00615* (2013.01)

(58) Field of Classification Search
CPC .. H04N 1/00615; H04N 1/0066; B65H 9/004; B65H 9/04; B65H 9/06; B65H 9/08; B65H 2301/362; B65H 2301/363; B65H 2404/72; B65H 2404/722; B65H 2404/725; B65H 3/34

USPC ......................................... 271/117, 121, 122
See application file for complete search history.

(56) References Cited

U.S. PATENT DOCUMENTS

| | | | |
|---|---|---|---|
| 6,547,235 B2 * | 4/2003 | Higaki | B65H 3/34 271/118 |
| 6,598,873 B2 * | 7/2003 | Takisawa | B65H 3/56 271/254 |
| 7,398,970 B2 * | 7/2008 | Morimoto | B65H 3/565 271/118 |
| 8,118,299 B2 | 2/2012 | Sato | |
| 8,313,097 B2 * | 11/2012 | Kayama | B65H 3/34 271/117 |

(Continued)

FOREIGN PATENT DOCUMENTS

JP 2010-132383 A 6/2010
JP 2018-150134 A 9/2018

*Primary Examiner* — Leslie A Nicholson, III
(74) *Attorney, Agent, or Firm* — ScienBiziP, P.C.

(57) ABSTRACT

A turnable sheet stopper blocks and passes a sheet conveyed on a sheet guide, and includes a proximal portion, a distal portion connected to the end of the proximal portion, and a folding mechanism that connects the distal portion to the proximal portion. The sheet stopper transitions between first and second positions. In the second position, the proximal and distal portions integrally turn to the downstream side in the sheet conveyance direction to allow the sheet to pass. The sheet stopper transitions from the second position to a third position when a user draws out the sheet from an upstream side. In the third position, the distal portion folds toward the upstream side to allow the sheet to be drawn out. During transition from the second position to the third position, the edge of the distal portion is located on or away from an outer surface of the sheet guide.

10 Claims, 8 Drawing Sheets

(56) References Cited

U.S. PATENT DOCUMENTS

| | | | |
|---|---|---|---|
| 8,517,373 B2* | 8/2013 | Harada | B65H 3/0684 |
| | | | 271/118 |
| 8,528,895 B2* | 9/2013 | Hanamoto | B65H 3/0684 |
| | | | 271/117 |
| 8,708,329 B2* | 4/2014 | Hanamoto | B65H 3/34 |
| | | | 271/118 |
| 8,970,855 B2* | 3/2015 | Muraoka | B65H 3/34 |
| | | | 358/1.12 |
| 9,242,819 B2* | 1/2016 | Takezawa | B65H 3/56 |
| 9,963,310 B2* | 5/2018 | Hanamoto | B65H 7/06 |
| 10,266,353 B2 | 4/2019 | Hanamoto | |
| 10,723,576 B2* | 7/2020 | Kuriki | B65H 3/0653 |
| 11,242,213 B2* | 2/2022 | Zaitsu | B65H 3/0684 |
| 2010/0133741 A1 | 6/2010 | Sato | |
| 2018/0257888 A1 | 9/2018 | Hanamoto | |

\* cited by examiner

SHEET STOPPER AND IMAGE FORMING APPARATUS

BACKGROUND OF THE INVENTION

Field of the Invention

The disclosure relates to a sheet stopper and an image forming apparatus.

Description of the Background Art

Sheet stoppers are usually used in image forming apparatuses, such as copiers, multifunction peripherals, printers, and facsimile machines, to block and pass sheets. A sheet stopper is disposed upstream in the sheet conveyance direction relative to, for example, the supply roller that feeds the sheet into the sheet conveyance path. Conventional sheet stoppers are known to be able to transition between a first position in which the sheet is blocked and a second position in which the sheet turns toward the downstream in the sheet conveyance direction to allow the sheet to pass through. Together with these sheet stoppers, sheet guides are also used to guide the sheets to the supply rollers, etc.

When "sheet jam" occurs during sheet conveyance, in which the normal conveyance of a sheet is interfered with due to some influence (e.g., the sheet being caught on other parts in the conveyance path), it can be presumed that the sheet is pulled out from the upstream side in the sheet conveyance direction in order to clear the sheet jam.

However, the distal portion 92 of a conventional sheet stopper 91, such as that illustrated in FIGS. 7 and 8, is structured so as to be able to move under the outer surface of a sheet guide 90. Thus, there is a problem in that, when a sheet is to be pulled out in the sheet conveyance direction F from the upstream side, the sheet is entangled in a zigzag shape between the distal portion 92 of the sheet stopper 91 and the sheet guide 90 making it difficult to pull out the sheet. Even if the sheet is pulled out from the upstream side in the sheet conveyance direction F, there is a problem in that the sheet may be damaged by contact with the distal portion 92 of the sheet stopper 91 or a sheet piece may remain in the image forming apparatus due to the damage.

An object of the disclosure, which has been made to solve the above conventional problems, is to provide a sheet stopper and an image forming apparatus including a sheet stopper that can pull out a sheet from the upstream side in the sheet conveyance direction without difficulty.

SUMMARY OF THE INVENTION

To achieve the above object, a sheet stopper according to this application is disposed in a turnable manner and blocks and passes a sheet conveyed on a sheet guide, the sheet stopper including a proximal portion disposed adjacent to a turning fulcrum; a distal portion connected to an end of the proximal portion; and a folding mechanism that connects the distal portion to the proximal portion in a foldable manner, wherein, the sheet stopper is capable of transitioning between a first position and a second position, the first position being a position in which the proximal portion and the distal portion integrally block the sheet, the second position being a position in which the proximal portion and the distal portion integrally turn to a downstream side in the sheet conveyance direction when the sheet is conveyed to allow the sheet to pass, the sheet stopper is capable of transitioning from the second position to a third position when a user draws out the sheet from an upstream side in the sheet conveyance direction, the third position being a position in which the distal portion folds toward the upstream side in the sheet conveyance direction relative to the proximal portion to allow the sheet to be drawn out, and in a process of transitioning from the second position to the third position, a leading edge of the distal portion is located on or away from an outer surface of the sheet guide.

The sheet stopper may transition to the first position by its own weight.

In the sheet stopper, the folding mechanism may include a connector that connects the distal portion to the proximal portion in a turnable manner.

The sheet stopper may be capable of transitioning from the first position to a fourth position when a user draws out the sheet from the upstream side in the sheet conveyance direction, the fourth position being a position in which the distal portion folds toward the upstream side in the sheet conveyance direction relative to the proximal portion to allow the sheet to be drawn out.

The sheet stopper may be capable of transitioning from the second position or the third position to a fifth position when a user draws out the sheet obliquely upward from the upstream side in the sheet conveyance direction, the fifth position being a position in which the proximal portion further turns to the downstream side in the sheet conveyance direction at the turning fulcrum, and the distal portion folds toward the upstream side in the sheet conveyance direction relative to the proximal portion to allow the sheet to be drawn out.

An image forming apparatus according to this application includes the sheet stopper.

According to the disclosure, sheets can be drawn out from the upstream side in the sheet conveyance direction without difficulty.

DESCRIPTION OF THE PREFERRED EMBODIMENTS

A description will hereinafter be made on embodiments of the present disclosure with reference to the accompanying drawings. Components that are common in the embodiments described below will be denoted by the same reference sign, and an overlapping description thereon will not be made.

First Embodiment

Overall Configuration of Image Forming Apparatus

First, a description will be made on the overall configuration of an image forming apparatus A in a first embodiment.

Figure 1:
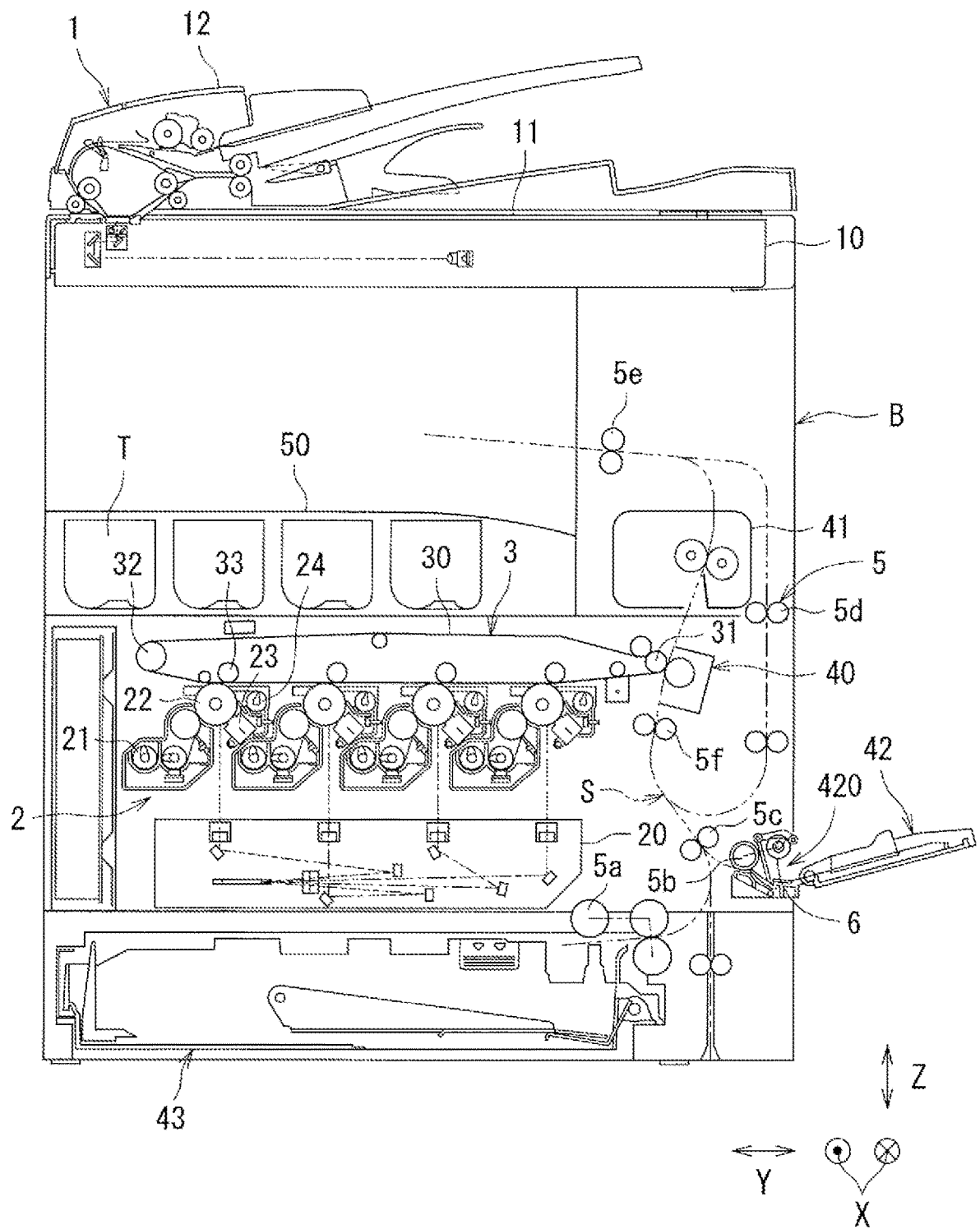
FIG. 1 is a schematic cross-sectional view of the configuration of an image forming apparatus according to a first embodiment.

FIG. 1 is a schematic cross-sectional view illustrating a configuration of an image forming apparatus A according to a first embodiment. In the drawings, a reference character X indicates a width direction (i.e., a depth direction), in which a -X direction (i.e., a minus X direction) defines a front direction and a +X direction (i.e., a plus X direction) defines the rear direction. The reference character Y indicates a left and right direction orthogonal to the width direction X, in which a -Y direction (i.e., a minus Y direction) defines a left direction and a +Y direction (i.e., a plus Y direction) defines the right direction. A reference character Z indicates an up and down direction, in which the -Z direction (minus Z direction) is defined as the downward direction and the +Z direction (plus Z direction) is defined as the upward direction. These settings will be the same in the embodiments, which will be described below.

The image forming apparatus A is an electrophotographic image forming apparatus, and is a color multifunction peripheral of an intermediate transfer method capable of printing full-color images. The image forming apparatus A includes an image reader 1 and an image forming apparatus body B (see FIG. 1). In the present embodiment, yellow (Y), magenta (M), cyan (C), and black (K) toners are used for printing by the image forming apparatus A.

The image reader 1 reads images from a document and is disposed in the upper portion of the image forming apparatus A. The image reader 1 includes a document reading device 10, a document loading table 11, and an automatic document processing device 12 (see FIG. 1).

The document reading device 10 emits light to the document and reads the images of the document on basis of the reflected light. The document loading table 11 is the part on which the document is loaded by a user and is disposed on the top side of the document reading device 10. The document loading table 11 is composed of transparent glass. The automatic document processing device 12 automatically and continuously conveys the document inserted by a user to the document reading device 10, and is disposed above the document loading table 11. The image of the document is read by the document reading device 10 with the document being loaded on the document loading table 11 or with the document being automatically conveyed to the document reading device 10 by the automatic document processing device 12.

The image forming apparatus body B includes an image former 2, an intermediate transfer body 3, a secondary transferer 40, a fusing device 41, a manual feed tray 42, a sheet container 43, a sheet roller group 5, and a sheet ejector 50 (see FIG. 1) The image forming apparatus A is provided with a sheet conveyance path S through which a sheet is conveyed.

The image former 2 forms toner images of the respective colors on the basis of the image data and includes an exposure device 20, developing devices 21, image carriers 22, chargers 23, and a cleaning unit 24 (see FIG. 1).

The exposure devices 20 each form an electrostatic latent image corresponding to each color on the corresponding image carrier 22 by exposing the surface of the image carrier 22 charged by the corresponding charger 23 in accordance with each color. The developing device 21 develops (visualizes) the electrostatic latent images formed on the surfaces of the respective image carriers 22 with toners of four colors (yellow (Y), magenta (M), cyan (C), and black (K)) supplied from toner cartridges T, and forms toner images. The image carriers 22 each forms an electrostatic latent image on its surface and is driven in a predetermined direction by a main motor (not illustrated). The rotational drive of the image carrier 22 conveys the toner image developed on the image carrier 22 to the intermediate transfer body 3. The corresponding charger 23 uniformly charges the surface of the image carrier 22 to a predetermined potential. The corresponding cleaning unit 24 removes residual toner remaining on the surface of the image carrier 22 after the image is developed and transferred. Through a series of operations based on the above configuration, toner images of the respective colors are formed on the surface of the respective image carriers 22.

The intermediate transfer body 3 is used for primary transfer and is positioned above the image carriers 22. The term "primary transfer" refers to the transferring of the toner images of the colors formed on the respective image carriers 22 onto an intermediate transfer belt 30. The intermediate transfer body 3 includes the intermediate transfer belt 30, a drive roller 31, a driven roller 32, and primary transfer rollers 33 (see FIG. 1).

The intermediate transfer belt 30 is an endless belt that is circulated in a predetermined direction, and is suspended on the drive roller 31 and the driven roller 32. The toner images of the respective colors visualized on the image carriers 22 are sequentially superposed and transferred onto the intermediate transfer belt 30 and conveyed to the secondary transferer 40 by the rotation of the intermediate transfer belt 30. The drive roller 31 is driven in a predetermined direction by the drive of a belt motor (not illustrated), and is disposed at one end of the intermediate transfer body 3. The rotational drive of drive roller 31 rotates the intermediate transfer belt 30. The driven roller 32 is disposed along the intermediate transfer belt 30 in a freely rotatable manner. The driven roller 32 is rotated in accordance with the circular movement of the intermediate transfer belt 30. The primary transfer rollers 33 are arranged in a row so that they correspond to the respective image carriers 22 across the intermediate transfer belt 30. The application of a transfer bias to the primary transfer rollers 33 causes the toner images formed on the image carriers 22 to be transferred to the intermediate transfer belt 30.

The secondary transferer 40 is provided for secondary transfer and is disposed on the sheet conveyance path S. The term "secondary transfer" refers to the transferring of the toner image transferred on the intermediate transfer belt 30 onto a sheet.

The fusing device 41 heats and melts the toner image transferred onto the sheet by fixing it to the sheet in order to fuse the toner image onto the sheet, and is disposed on the downstream side of the secondary transferer 40 in the sheet conveyance path S.

Sheets supplied to the image forming apparatus body B of the image forming apparatus A can be loaded on to the manual feed tray 42. The manual feed tray 42 is attached to the image forming apparatus body B in a turnable and openable manner. As used herein, "turning" shall include forward and reverse movement about an axis and turning about an axis.

By opening the manual feed tray 42, a sheet supply opening 420 is exposed. At the proximal side of the manual feed tray 42, disposed is a sheet supply device 6 that feeds a sheet from the manual feed tray 42 through the sheet supply opening 420 to the sheet conveyance path S. The sheet supply device 6 includes a pickup roller (not illustrated) that draws out the uppermost sheet of the sheets loaded on the manual feed tray 42, a supply roller 61 that feeds the uppermost sheet drawn out by the pickup roller to the sheet conveyance path S, and a separation roller 62 that forms a nip 63 between the separation roller 62 and the supply roller 61.

The sheet container 43 accommodates sheets supplied to the image forming apparatus body B, and is disposed below the image forming apparatus A.

The sheet roller group 5 includes a pickup roller 5a, conveyance rollers 5b to 5e, and a registration roller 5f. The pickup roller 5a draws out the uppermost sheet of the sheets in the sheet container 43 and feeds it to the sheet conveyance path S. The conveyance rollers 5b to 5e convey the sheet along the sheet conveyance path S. The registration roller 5f temporarily stops the sheet being conveyed from the sheet container 43 to register the leading edge of the sheet. The sheet roller group 5 is driven in rotation by a motor (not illustrated).

The sheet ejector 50 is disposed at in the upper portion of the image forming apparatus A and loads and draws printed sheets face-down.

Printing on a sheet is performed by the above image forming apparatus A as follows. The image former 2 forms a toner image based on image data generated by the image reader 1 or supplied by an external device. The primary transfer roller 33 transfers the toner image to the intermediate transfer belt 30 of the intermediate transfer body 3 through primary transfer. During this time, the pickup roller 5a draws a sheet from the sheet container 43, the conveyance roller 5b conveys the sheet to the registration roller 5f, and the registration roller 5f conveys the sheet to the secondary transferer 40. The secondary transferer 40 then performs secondary transfer of the toner image that has been transferred on the intermediate transfer belt 30 onto the sheet through secondary transfer. The fusing device 41 fuses, to the sheet, the toner image transferred through secondary transfer on the sheet. The conveyance roller 5e then conveys and ejects the sheet to the sheet ejector 50, to complete the printing on the sheet.

Sheet Stopper

Figure 2:
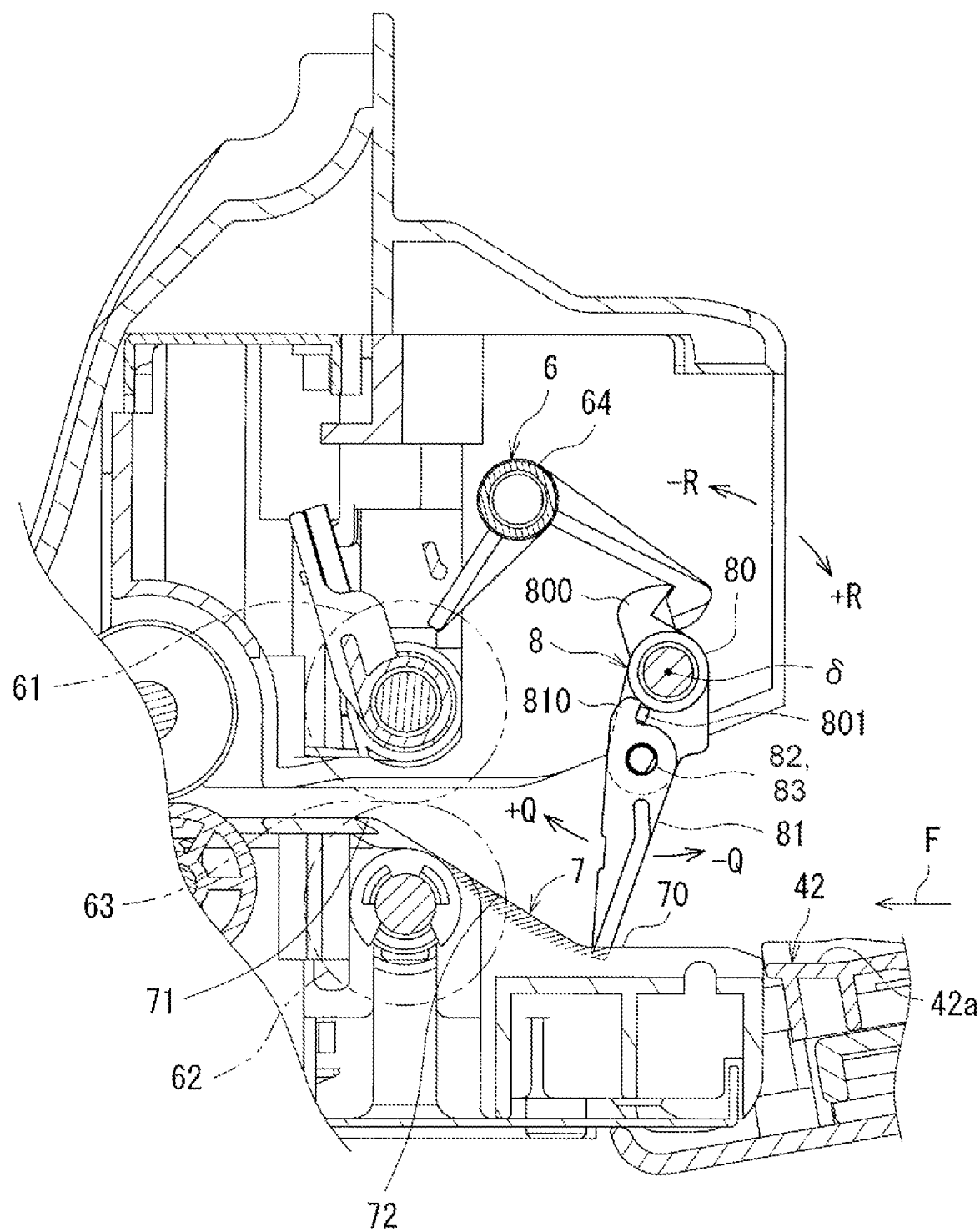
FIG. 2 is a partially broken front view of a sheet stopper in a first position, viewed from the front.

FIG. 2 is a partially broken front view of a sheet stopper 8 in a first position, viewed from the front.

Upstream in the sheet conveyance direction F from the supply roller 61 and the separation roller 62 of the sheet supply device 6 of the image forming apparatus A described above, there is a sheet guide 7 that guides the sheet to the nip 63 between the supply roller 61 and the separation roller 62, and sheet stoppers 8 that block and passes the sheet being conveyed on the sheet guide 7 (see FIG. 2). In the present embodiment, the sheet stoppers 8 are disposed on the two sides of the sheet supply device 6. The sheet supply device 6 described above further includes stoppers 64 that can regulate the turning of the sheet stoppers 8. The sheet guide 7 and the sheet stoppers 8 will now be described in detail.

The sheet guide 7 is formed to have a smooth upward slope from the outer surface of a lifting plate 42a supporting the sheet from the bottom surface of the manual feed tray 42 to the nip 63 (see FIG. 2). Specifically, the sheet guide 7 has an upstream side portion 70 adjacent to the manual feed tray 42, a downstream side portion 71 adjacent to the nip 63, and a tilt portion 72 connecting the upstream side portion 70 and the downstream side portion 71. The sheet guide 7 has a slit (not illustrated) along the sheet conveyance direction F through which the sheet stoppers 8 can be loosely inserted.

The sheet stoppers 8 are turnable in the R direction around a turning fulcrum 6 supported on a frame (not illustrated). Hereinafter, the turning direction of the sheet stoppers 8 (specifically, proximal portions 80) downstream of the sheet conveyance direction F, i.e., toward the supply roller 61 and the separation roller 62, is defined as the +R direction, and the turning direction of the sheet stoppers 8 (specifically, the proximal portions 80) upstream of the sheet conveyance direction F, i.e., away from the supply roller 61 and the separation roller 62, is defined as the −R direction.

The sheet stoppers 8 each has a proximal portion 80 adjacent to the turning fulcrum 6, a distal portion 81 connected to the end of the proximal portion 80, and a folding mechanism 82 that connects the proximal portion 80 with the distal portion 81 in a foldable manner in a Q direction (see FIG. 2). Hereinafter, the folding direction of the distal portion 81 downstream of the sheet conveyance direction F, i.e., toward the supply roller 61 and the separation roller 62, is defined as the +Q direction, and the folding direction of the distal portion 81 upstream of the sheet conveyance direction F, i.e., away from the supply roller 61 and the separation roller 62, is defined as the −Q direction.

The proximal portion 80 is provided with an engaged portion 800 to be engaged with the corresponding stopper 64 of the sheet supply device 6, and an abutted portion 801 can be abutted by the distal portion 81 (see FIG. 2).

The engaged portion 800 is formed in a substantial hook shape protruding from the opposite side of the turning fulcrum 6 relative to the distal portion 81. The engaged portion 800 of the proximal portion 80 engages the stopper 64 of the sheet supply device 6, to restrict the turning of the proximal portion 80. In contrast, the engaged portion 800 of the proximal portion 80 disengages the stopper 64 of the sheet supply device 6, to release the restriction of the turning of the proximal portion 80. In other words, the turning of the proximal portion 80 is regulated or the regulation is released in conjunction with the operation of the stopper 64 of the sheet supply device 6.

The abutted portion 801 is formed as a projection on the side face adjacent to the distal portion 81.

The distal portion 81 is tapered from the proximal portion 80 to the end. The distal portion 81 is designed to hang down toward the upstream side portion 70 of the sheet guide 7 by its own weight. The distal portion 81 has an abutting portion 810 capable of abutting the abutted portion 801 of the proximal portion 80 in the folding direction +Q direction.

In the present embodiment, the folding mechanism 82 includes a connecting member 83 that connects the distal portion 81 to the proximal portion 80 in a turnable manner (see FIG. 2). The connecting member 83 is formed, for example, in a pin shape protruding from one side surface of the proximal portion 80, and passes through a connecting hole (not illustrated) of the distal portion 81. Such a connecting member 83 readily realizes the folding mechanism 82 that connects the distal portion 81 to the proximal portion 80 so that the distal portion 81 can fold relative to the proximal portion 80.

Figure 3:
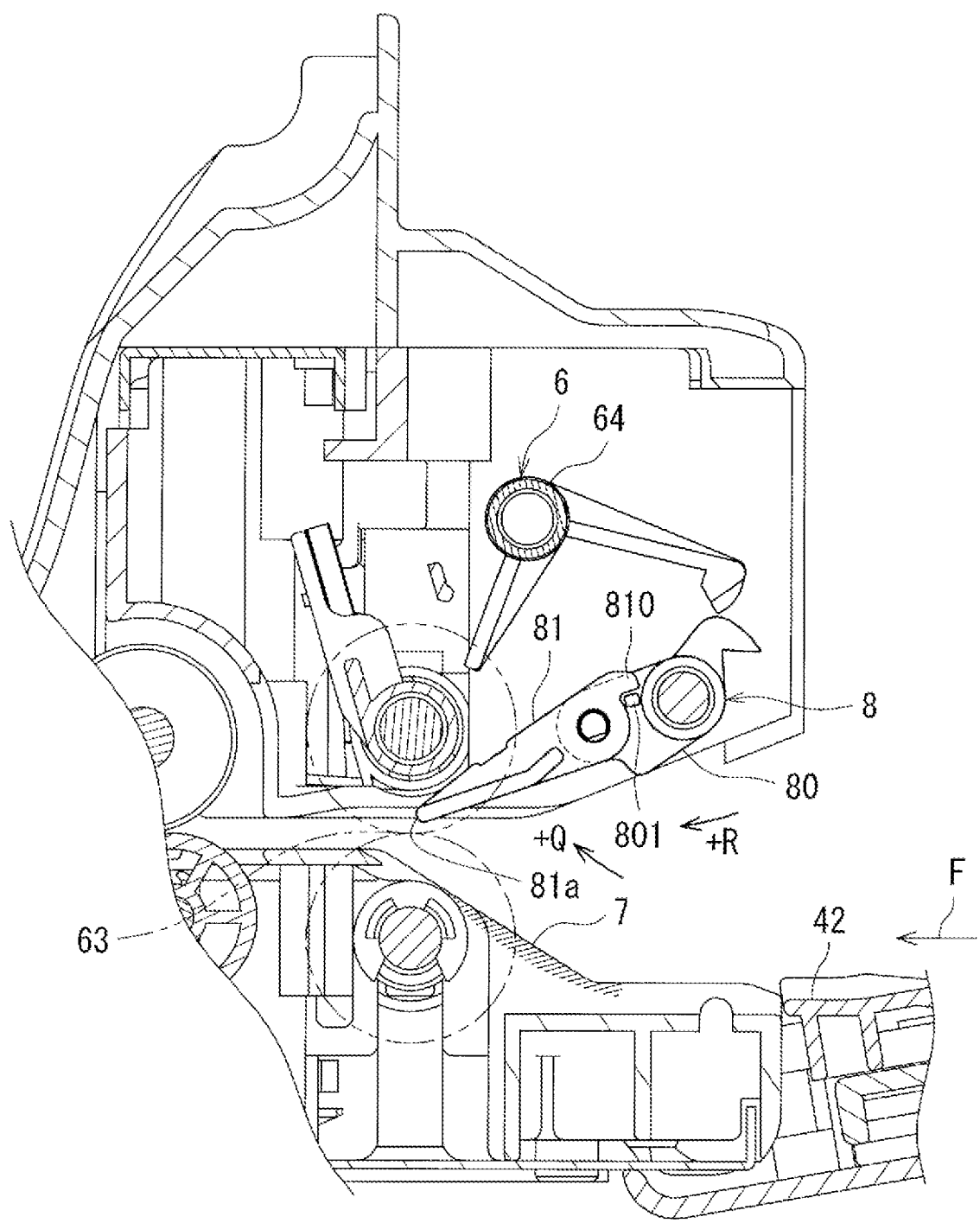
FIG. 3 is a partially broken front view of the distal portion of the sheet stopper in a second position in a state in which the distal portion points to the downstream side in the sheet conveyance direction, viewed from the front.
Figure 4:
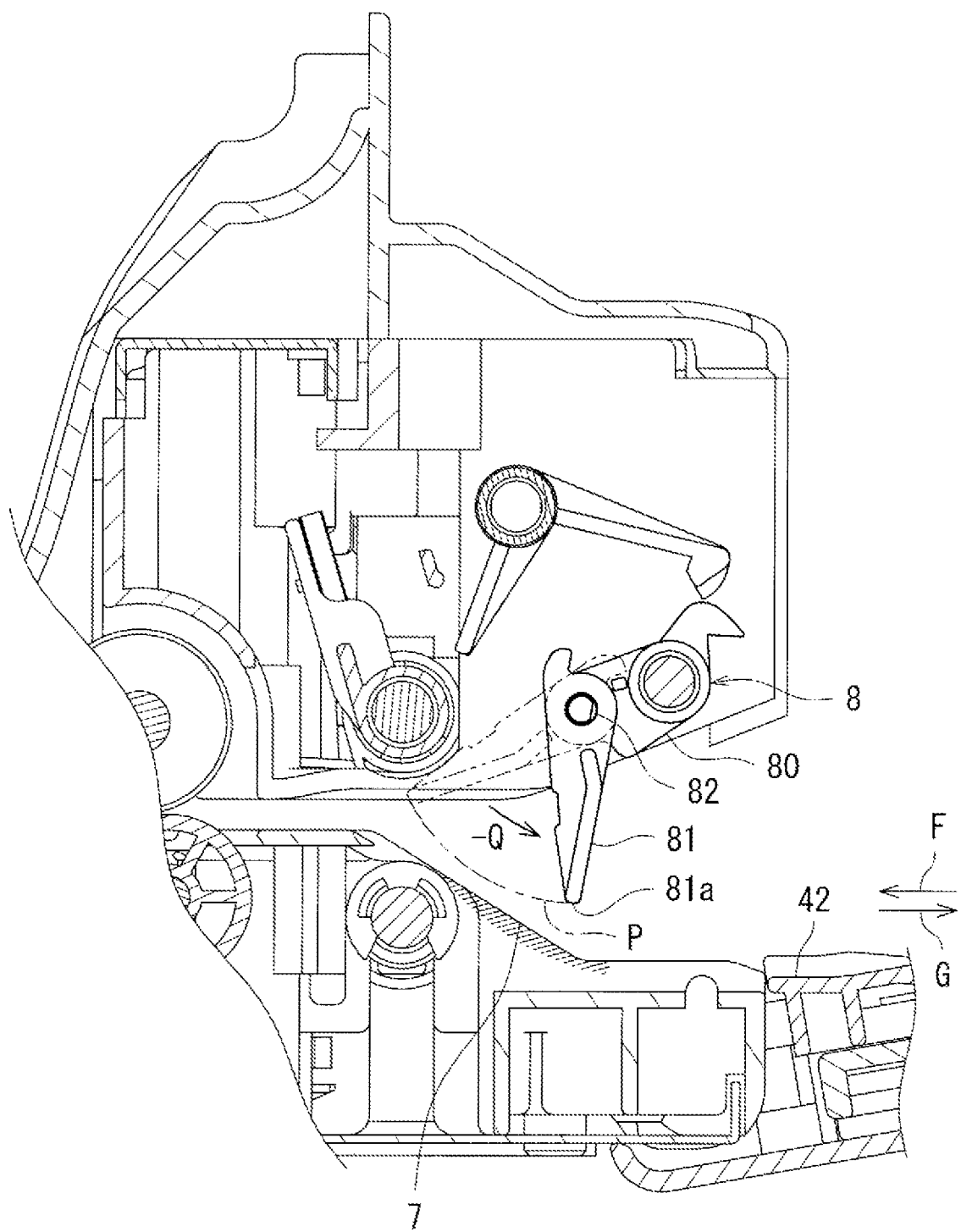
FIG. 4 is a partially broken front view of the distal portion of the sheet stopper in a third position in a state in which the distal portion points to the upstream side in the sheet conveyance direction, viewed from the front.

FIG. 3 is a partially broken front view of the distal portion 81 of the sheet stopper 8 in a second position in a state in which the distal portion 81 points to the downstream side in the sheet conveyance direction F, viewed from the front. FIG. 4 is a partially broken front view of the distal portion

81 of the sheet stopper 8 in a third position in a state in which the distal portion 81 points to the upstream side in the sheet conveyance direction F, viewed from the front. In FIG. 4, the double-dashed line indicates the outline of the sheet stopper 8 in FIG. 2.

The sheet stopper 8 described above is capable of transitioning between a first position in which the proximal portion 80 and the distal portion 81 integrally block the sheet loaded on the manual feed tray 42, and a second position in which the proximal portion 80 and the distal portion 81 integrally turn to the downstream side in the sheet conveyance direction F to allow the conveyed sheet to pass. When the user draws out the sheet from the upstream side in the sheet conveyance direction F, the sheet stopper 8 is capable of transitioning from the second position to the third position in which the distal portion 81 folds toward the upstream side in the sheet conveyance direction F relative to the proximal portion 80 to allow the sheet to be drawn out. The first through third positions are described below.

As illustrated in FIG. 2, in the first position, the proximal portion 80 of the sheet stopper 8 engages with the stopper 64 of the sheet supply device 6 with the engaged portion 800, and is restricted from turning. The distal portion 81 hangs down toward the upstream side portion 70 of the sheet guide 7 by its own weight and is loosely inserted into the slit (not illustrated) of the sheet guide 7. The distal portion 81 abuts the abutted portion 801 of the proximal portion 80 at the abutting portion 810, and is in a state in which folding in the downstream side (+Q direction) of the sheet conveyance direction F is restricted. In this way, the sheet stopper 8 is in the first position, with the proximal portion 80 and the distal portion 81 integrally blocking the sheet loaded on the manual feed tray 42.

As illustrated in FIG. 3, in the second position, the proximal portion 80 of the sheet stopper 8 is released from engagement with the stopper 64 of the sheet supply device 6 and is capable of turning. The distal portion 81 is urged in the downstream side (+Q direction) in the sheet conveyance direction F by the sheet drawn out and conveyed by the pickup roller (not illustrated) of the sheet supply device 6, and abuts on the abutted portion 801 of the proximal portion 80 by the abutting portion 810. The proximal portion 80 and the distal portion 81 are integrally turned in the downstream side (+R direction) of the sheet conveyance direction F by pressure from the sheet. In this way, the sheet stopper 8 in the second position allows the sheet loaded on the manual feed tray 42 to pass.

The transition of the sheet stopper 8 from the second position to the first position is achieved by the distal portion 81 of the sheet stopper 8 hanging down toward the upstream side portion 70 of the sheet guide 7 by its own weight, and then by the turning of the proximal portion 80 being restricted by the stopper 64 of the sheet supply device 6. In other words, in the present embodiment, the sheet stopper 8 transitions to the first position by its own weight. This allows the sheet stopper 8 to transition to the first position with a simple structure, reduces the cost of the sheet stopper 8, and facilitates its assembly.

The transition of the sheet stopper 8 from the first position to the second position is achieved by releasing the restriction on the turning of the proximal portion 80 by the stopper 64 of the sheet supply device 6 and conveying the sheet in the sheet conveyance direction F by the sheet supply device 6.

Subsequently, as illustrated in FIG. 4, in the third position, the proximal portion 80 of the sheet stopper 8 is in a turnable state as in the second position. The distal portion 81 folds at the folding mechanism 82 toward the manual feed tray 42, that is, toward the upstream side (−Q direction) of the sheet conveyance direction F in conjunction with the movement of the sheet drawn by the user along the drawing direction G in the direction opposite to the sheet conveyance direction F from the upstream side in the sheet conveyance direction F. In this way, the sheet stopper 8 in the third position allows the sheet to be drawn out from the upstream side in the sheet conveyance direction F.

The transition of the sheet stopper 8 from the second position to the third position is achieved by the user drawing the sheet along the drawing direction G from the upstream side in the sheet conveyance direction F.

As illustrated in FIGS. 3 and 4, in the process of transitioning from the second position to the third position, the leading edge 81*a* of the distal portion 81 is positioned away from the sheet guide 7. In other words, the movement trajectory P of the leading edge 81*a* of the distal portion 81 in the process of transitioning from the second position to the third position is located away from the sheet guide 7. Since this secures a clearance between the distal portion of the sheet stopper 8 and the sheet guide 7 on the sheet drawing path to the upstream side in the sheet conveyance direction F, the sheet can be drawn out from the upstream side in the sheet conveyance direction F without any difficulty.

Although not illustrated, the leading edge 81*a* of the distal portion 81 may be positioned on the outer surface of the sheet guide 7 in the process of the transition from the second position to the third position. Since this allows the sheet to be drawn out in a flatter state as compared with that of the conventional structure in which the distal portion 81 may move under the outer surface of the sheet guide 7, the advantageous effect described above is also achieved in this case because the sheet can be drawn out from the upstream side in the sheet conveyance direction F without any difficulty.

The restriction or release of the restriction of the turning of the proximal portion 80 does not have to be in conjunction with the operation of the stopper 64 of the sheet supply device 6. Alternatively, a separate configuration for restricting and releasing the restriction of the turning of the proximal portion 80 may be provided.

The configuration of the folding mechanism 82 is not limited to the above, and may, for example, be configured using gears or the like.

Second Embodiment

The second embodiment will now be described only with respect to points different from the first embodiment.

Figure 5:
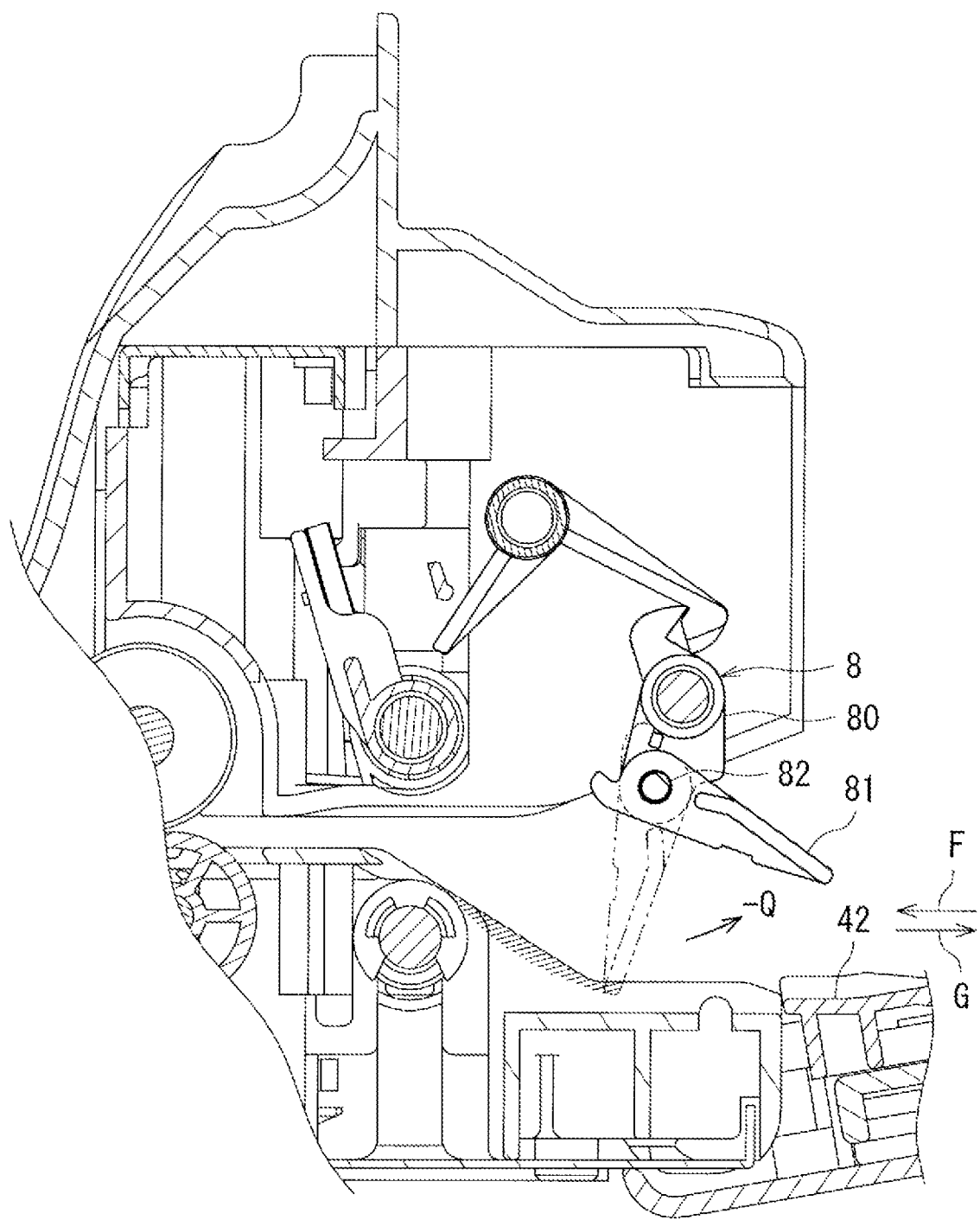
FIG. 5 is a partially broken front view of the distal portion of the sheet stopper in a fourth position in a state in which the distal portion points to the upstream side in the sheet conveyance direction, viewed from the front.

FIG. 5 is a partially broken front view of the distal portion 81 of the sheet stopper 8 in a fourth position in a state in which the distal portion 81 points to the upstream side in the sheet conveyance direction F, viewed from the front. In FIG. 5, a broken line indicates the outline of the sheet stopper 8 in the first position.

In the second embodiment, when the user draws out the sheet from the upstream side in the sheet conveyance direction F, the sheet stopper 8 is capable of transitioning from the first position to the fourth position in which the distal portion 81 folds toward the upstream side (−Q direction) in the sheet conveyance direction F to allow the sheet to be drawn out.

Specifically, as illustrated in FIG. 5, in the fourth position, the turning of the proximal portion 80 of the sheet stopper 8 is restricted as in the first position. The distal portion 81 folds at the folding mechanism 82 toward the manual feed tray 42, that is, toward the upstream side (−Q direction) of the sheet conveyance direction F in conjunction with the movement of the sheet drawn by the user along the drawing direction G from the upstream side in the sheet conveyance direction F. In this way, the sheet stopper 8 in the fourth position allows the sheet to be drawn out from the upstream side in the sheet conveyance direction F.

The transition of the sheet stopper 8 from the first position to the fourth position is achieved by the user drawing the sheet along the drawing direction G from the upstream side in the sheet conveyance direction F.

As described above, since the sheet stopper 8 is capable of transitioning from the first position to the fourth position, the sheet can be drawn out from the upstream side in the sheet conveyance direction F not only when the sheet stopper 8 is in the second position but also when it is in the first position.

Third Embodiment

The third embodiment will now be described only with respect to points different from the first embodiment.

Figure 6:
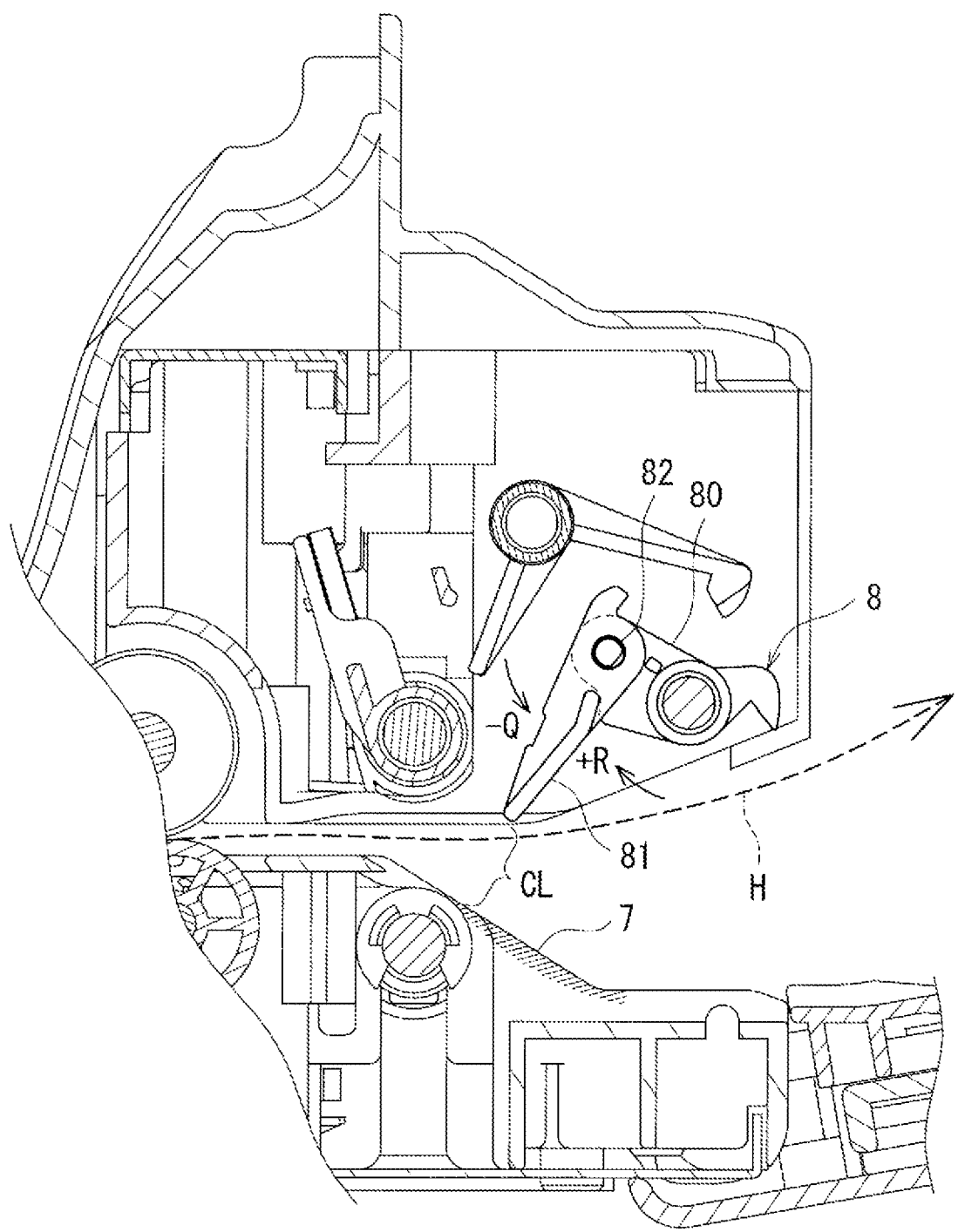
FIG. 6 is a partially broken front view of a sheet stopper in a fifth position, viewed from the front.
Figure 7:
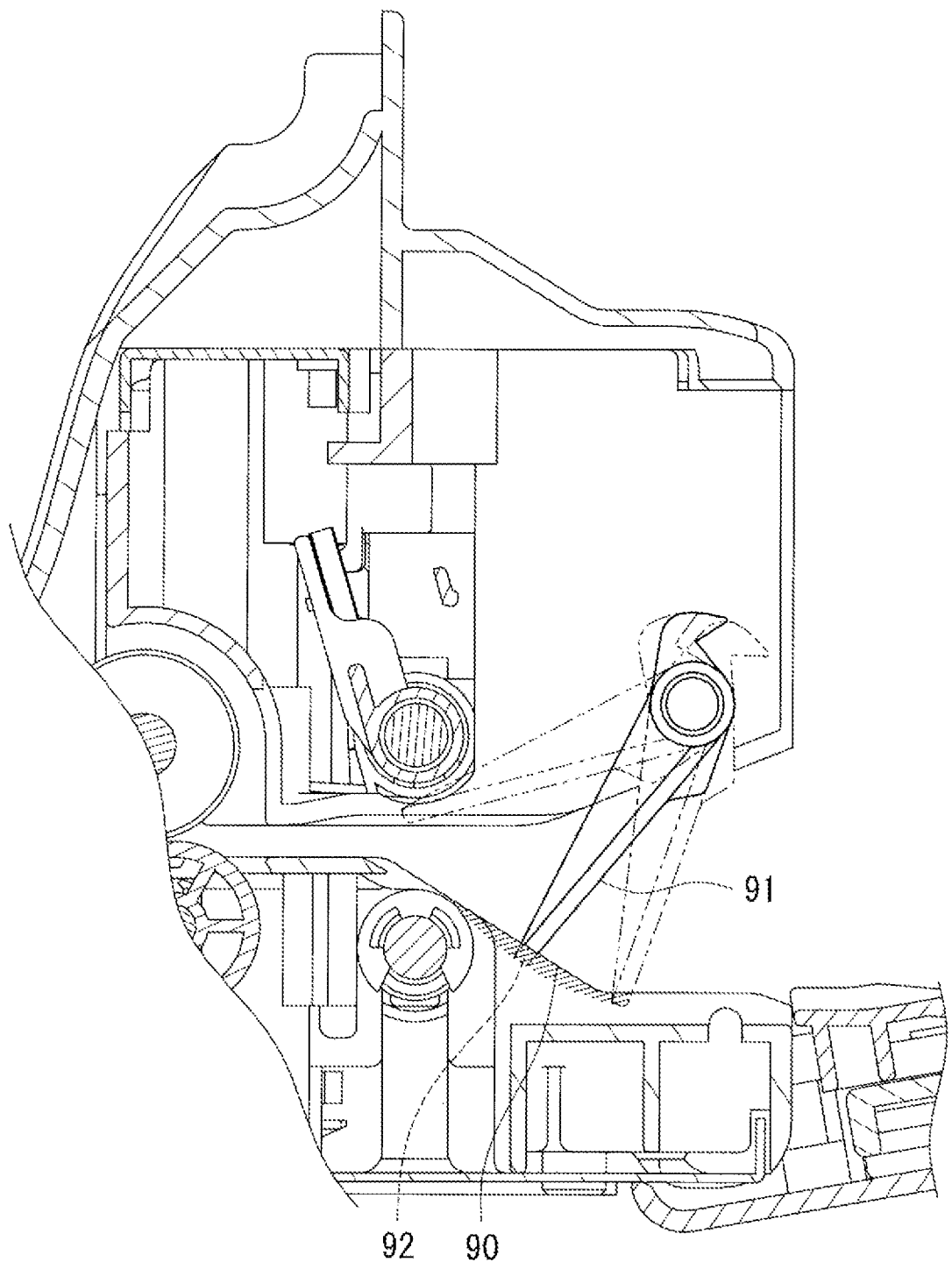
FIG. 7 is a partially broken front view of an example of a conventional sheet stopper.
Figure 8:
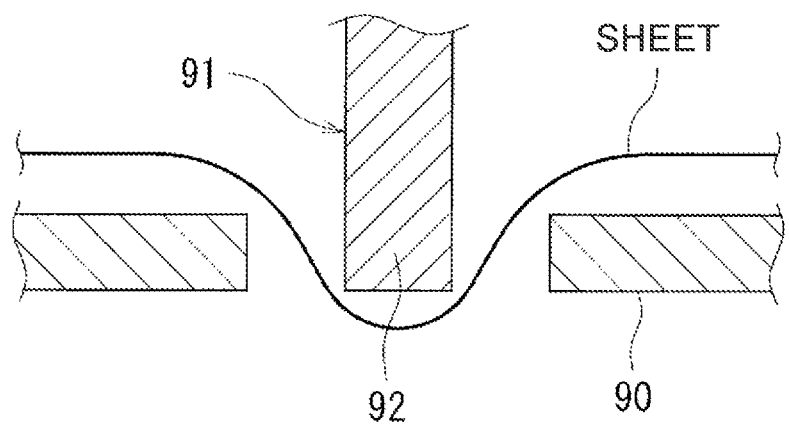
FIG. 8 is an enlarged schematic sectional view of the distal portion of the sheet stopper of FIG. 7 and the periphery of the sheet stopper.

FIG. 6 is a partially broken front view of a sheet stopper 8 in a fifth position, viewed from the front.

In the third embodiment, when the user draws out the sheet obliquely upward from the upstream side in the sheet conveyance direction F, the sheet stopper 8 can be transitioned from the second position or the third position to the fifth position in which the drawing of the sheet is allowed by the proximal portion 80 further turning to the downstream side in the sheet conveyance direction F at the turning fulcrum 6, and the distal portion 81 folding to the upstream side in the sheet conveyance direction F relative to the proximal portion 80.

Specifically, as illustrated in FIG. 6, in the fifth position, the proximal portion 80 of the sheet stopper 8 is in a turnable state as in the second position or the third position. The proximal portion 80 is urged upward from the sheet drawn out by the user along the drawing direction H obliquely upward from the upstream side in the sheet conveyance direction F via the distal portion 81, and further turns to the downstream side (+R direction) of the sheet conveyance direction F. The distal portion 81 is urged upward from the sheet being drawn out along the drawing direction H and folds relative to the proximal portion 80 in the sheet conveyance direction F upstream of F (in the −Q direction), and folds at the folding mechanism 82. In other words, the distal portion 81 folds in an L-shape relative to the proximal portion 80. At this time, a clearance CL is formed between the distal portion 81 and the sheet guide 7.

The transition of the sheet stopper 8 from the second position or the third position to the fifth position is achieved by the user drawing the sheet along the drawing direction H from the upstream side in the sheet conveyance direction F.

As described above, the sheet stopper 8 is capable of transitioning from the second position or the third position to the fifth position, and a clearance CL is formed between the distal portion 81 and the sheet guide 7 in the fifth position, to allow the sheet to be drawn out obliquely upward from the upstream side in the sheet conveyance direction F without any difficulty.

It should be noted that the embodiments and alternatives disclosed herein are illustrated as only examples in all respects and are not intended to provide any basis for limited interpretation. Therefore, a technical scope of the disclosure should be construed on the basis of a statement in the claims as attached hereto, not on the basis of the above-mentioned embodiments and alternatives only. Furthermore, any changes and modifications within the meaning and range equivalent to the claims fall within the scope of the disclosure.

What is claimed is:

1. A sheet stopper that is disposed in a turnable manner and blocks and passes a sheet conveyed on a sheet guide, the sheet stopper comprising:
    a proximal portion disposed adjacent to a turning fulcrum;
    a distal portion connected to an end of the proximal portion; and
    a folding mechanism that connects the distal portion to the proximal portion in a foldable manner, wherein
    the sheet stopper is capable of transitioning between a first position and a second position, the first position being a position in which the proximal portion and the distal portion integrally block the sheet, the second position being a position in which the proximal portion and the distal portion integrally turn to a downstream side in a sheet conveyance direction when the sheet is conveyed to allow the sheet to pass,
    the sheet stopper is capable of transitioning from the second position to a third position when the sheet is drawn out from an upstream side in the sheet conveyance direction, the third position being a position in which the distal portion folds toward the upstream side in the sheet conveyance direction relative to the proximal portion to allow the sheet to be drawn out,
    in a process of transitioning from the second position to the third position, a leading edge of the distal portion is located on or away from an outer surface of the sheet guide, and
    the sheet stopper is capable of transitioning from the first position to a fourth position when the sheet is drawn out from the upstream side in the sheet conveyance direction, the fourth position being a position in which the distal portion folds toward the upstream side in the sheet conveyance direction relative to the proximal portion to allow the sheet to be drawn out.

2. The sheet stopper according to claim 1, wherein the sheet stopper transitions to the first position by a weight of the sheet stopper.

3. The sheet stopper according to claim 1, wherein the folding mechanism includes a connector that connects the distal portion to the proximal portion in a turnable manner.

4. The sheet stopper according to claim 1, wherein the sheet stopper is capable of transitioning from the second position or the third position to a fifth position when the sheet is drawn out obliquely upward from the upstream side in the sheet conveyance direction, the fifth position being a position in which the proximal portion further turns to the downstream side in the sheet conveyance direction at the turning fulcrum, and the distal portion folds toward the upstream side in the sheet conveyance direction relative to the proximal portion to allow the sheet to be drawn out.

5. An image forming apparatus comprising:
    the sheet stopper according to claim 1.

6. A sheet stopper that is disposed in a turnable manner and blocks and passes a sheet conveyed on a sheet guide, the sheet stopper comprising:
    a proximal portion disposed adjacent to a turning fulcrum;
    a distal portion connected to an end of the proximal portion; and
    a folding mechanism that connects the distal portion to the proximal portion in a foldable manner, wherein,
    the sheet stopper is capable of transitioning between a first position and a second position, the first position being a position in which the proximal portion and the distal portion integrally block the sheet, the second position being a position in which the proximal portion and the distal portion integrally turn to a downstream side in a sheet conveyance direction when the sheet is conveyed to allow the sheet to pass, the sheet stopper is capable of transitioning from the second position to a third position when the sheet is drawn out from an upstream side in the sheet conveyance direction, the third position being a position in which the distal portion folds toward the upstream side in the sheet conveyance direction relative to the proximal portion to allow the sheet to be drawn out, in a process of transitioning from the second position to the third position, a leading edge of the distal portion is located on or away from an outer surface of the sheet guide, and the sheet stopper is capable of transitioning from the second position or the third position to a fifth position when the sheet is drawn out obliquely upward from the upstream side in the sheet conveyance direction, the fifth position being a position in which the proximal portion further turns to the downstream side in the sheet conveyance direction at the turning fulcrum, and the distal portion folds toward the upstream side in the sheet conveyance direction relative to the proximal portion to allow the sheet to be drawn out.

7. The sheet stopper according to claim 6, wherein the sheet stopper transitions to the first position by a weight of the sheet stopper.

8. The sheet stopper according to claim 6, wherein the folding mechanism includes a connector that connects the distal portion to the proximal portion in a turnable manner.

9. The sheet stopper according to claim 6, wherein the sheet stopper is capable of transitioning from the first position to a fourth position when the sheet is drawn out from the upstream side in the sheet conveyance direction, the fourth position being a position in which the distal portion folds toward the upstream side in the sheet conveyance direction relative to the proximal portion to allow the sheet to be drawn out.

10. An image forming apparatus comprising:
the sheet stopper according to claim 6.

* * * * *